(12) United States Patent
Rhody

(10) Patent No.: US 6,557,332 B2
(45) Date of Patent: May 6, 2003

(54) CONTROL VALVE FOR SWITCHING A HYDRAULIC PISTON-CYLINDER UNIT FOR PURPOSES OF DRIVING AN OSCILLATORY MACHINE PART

(75) Inventor: Karl-Thomas Rhody, Lichtenau (DE)

(73) Assignee: CLAAS Industrietechnik GmbH, Paderborn (DE)

( * ) Notice: Subject to any disclaimer, the term of this patent is extended or adjusted under 35 U.S.C. 154(b) by 0 days.

(21) Appl. No.: 09/854,341

(22) Filed: Aug. 30, 2001

(65) Prior Publication Data

US 2002/0005113 A1 Jan. 17, 2002

(30) Foreign Application Priority Data

May 12, 2000 (DE) .......................................... 100 23 340

(51) Int. Cl.⁷ .......................... A01D 69/03; F15B 11/15
(52) U.S. Cl. .......................... 56/10.9; 56/11.9; 56/257; 56/264; 56/DIG. 11; 91/171; 91/189 A; 60/374
(58) Field of Search .............................. 55/10.2 R, 10.5, 55/10.8, 10.9, 11.2, 257, 264, 296, 297, 298, 299, 306, DIG. 11, DIG. 17; 91/171, 178, 189 A, 290, 296, 297, 298, 319, 536; 60/374

(56) References Cited

U.S. PATENT DOCUMENTS

| 2,484,861 | A | * | 10/1949 | Stewart ........................ 56/257 |
| 2,569,507 | A | * | 10/1951 | Von Schlegell ............... 56/296 |
| 2,588,002 | A | * | 3/1952 | Holmes ........................ 56/10.9 |
| 2,588,003 | A | * | 3/1952 | Holmes ........................ 56/10.9 |
| 2,917,026 | A | * | 12/1959 | Hall et al. ..................... 91/536 |
| 3,823,534 | A | * | 7/1974 | Bornzin et al. ............... 56/296 |
| 4,082,032 | A | * | 4/1978 | Swenson ...................... 91/290 |
| 4,280,396 | A | * | 7/1981 | Zeuner et al. ................. 91/320 |
| 4,319,609 | A | * | 3/1982 | Debrus .......................... 91/536 |
| 4,402,174 | A | * | 9/1983 | Boone .......................... 56/296 |
| 4,510,973 | A | * | 4/1985 | Balaskas ....................... 91/536 |
| 5,787,786 | A | * | 8/1998 | Zeuner .......................... 56/296 |

FOREIGN PATENT DOCUMENTS

| DE | 82 09 146 | 4/1983 |
| DE | 29 04 293 | 12/1988 |
| DE | 195 29 067 | 2/1997 |

* cited by examiner

Primary Examiner—Robert E. Pezzuto
Assistant Examiner—Nathan Mammen
(74) Attorney, Agent, or Firm—Husch & Eppenberger, LLC; Robert E. Muir; Richard J. Musgrave

(57) ABSTRACT

A self-propelled combine harvester having a mechanically actuated directional control valve for a hydraulic piston-cylinder unit used for driving the cutter bar in an oscillatory manner. A switching bracket is used to axially move the mechanically actuated directional control valve from a first end position to a second end position and from the second end position to the first end position. A latch is used to periodically latch a piston valve stationary. A first plunger and second plunger are alternatively and axially moved by a first spring and second spring. The first plunger and the second plunger alternatively move the valve piston from the first end position and the second position and from the second position to the first position. The valve piston will be released from the first end position or the second end position one end position from which it was arrested or latched. The switching between the first end position and the second end position and from the second end position is thereby alternatively accomplished. This process of switching-over the valve piston will not be interrupted if there is a sudden decrease in pressure because the process is effected by the biased springs.

15 Claims, 2 Drawing Sheets

CONTROL VALVE FOR SWITCHING A HYDRAULIC PISTON-CYLINDER UNIT FOR PURPOSES OF DRIVING AN OSCILLATORY MACHINE PART

TECHNICAL FIELD OF THE INVENTION

The invention relates to harvesting equipment, and more specifically to a control valve for activating a hydraulic piston-cylinder unit thereby driving a cutter bar in an oscillatory manner.

DESCRIPTION OF THE RELATED ART

German Patent DE 195 29 067.4 illustrates a harvesting machine having a frontal attachment used for harvesting crops. The harvesting machine has a driving element containing a frame and an oscillating cutter bar, and a conveying element containing a rotary reel and an intake auger for conveying the harvested crop. Cutter blades are used in the oscillating cutter bar of the harvesting machines to cut crop during harvesting. Relevant working devices and a gear box are located externally from the cutter bar. The gear box and the drive means are extremely powerfull, especially for driving larger cutter bars, so as to ensure that the cutter blades are at the correct cutting position over a full working width of the cutter bars. The gear box and the drive means must also be able to withstand very large oscillatory forces. Due to the large length of the cutter bars and the power required to move the cutter blades, there are large inertial forces being produced by the cutter bar as it oscillates. These forces must be taken into account when designing the structure of the cutter bar. In addition, the force flow-path from the drive source to the cutter blades is very extensive and complex. The conventional mechanical drives used for driving the cutter blades of the cutter bar are of heavy and complex linking constructions which is a disadvantage.

German Design Patent 8209146.3 obviates this disadvantage by means of a hydraulic piston-cylinder unit for driving the cutter blades. This design generally functions satisfactorily. A switch-over valve constantly reverses the hydraulic fluid stream to the piston-cylinder unit. This switch-over valve is a critical feature and is actuated hydraulically. However, the disadvantage of this type of system is that it presupposes that there will always be a sufficient quantity of and pressure from hydraulic fluid for switching the switch-over valve into its respective end positions and retaining it there. If, for example, the pressure falls when the switch-over valve is in an intermediary position, it is virtually impossible to reset the system for continuous operation without manual intervention.

The present invention is directed to overcoming one or more of the problems set forth above.

SUMMARY OF THE INVENTION

An aspect of the invention is to provide a harvester with an improved mechanically actuated directional control valve for insuring that a valve piston of the mechanically actuated directional control valve reaches either a first or second end position even under a sudden decrease in pressure.

Another aspect of this invention is to provide a harvester having a hydraulic piston-cylinder unit operatively connected to a mechanically actuate directional control valve and a cutter bar. The harvester includes a valve housing located in the mechanically actuate directional control valve, a valve piston axially displaceable and operatively, moveably mounted in a central boring in the mechanically actuate directional control valve for switching the hydraulic piston-cylinder unit thereby driving a cutter bar in an oscillatory manner, and a first plunger and a second plunger operatively, alternatively, and axially displaced in the valve piston in the mechanically actuate directional control valve, wherein the mechanically actuate directional control valve is operatively connected to the hydraulic piston-cylinder unit.

The above aspects are merely illustrative examples of a few of the innumerable aspects associated with the present invention and should not be deemed an all-inclusive listing in any manner whatsoever.

BRIEF DESCRIPTION OF THE DRAWINGS

Reference is now made to the drawings, which illustrate the best known mode of carrying out the invention and wherein the same reference characters indicate the same or similar parts throughout the views.

DETAILED DESCRIPTION

Figure 1:
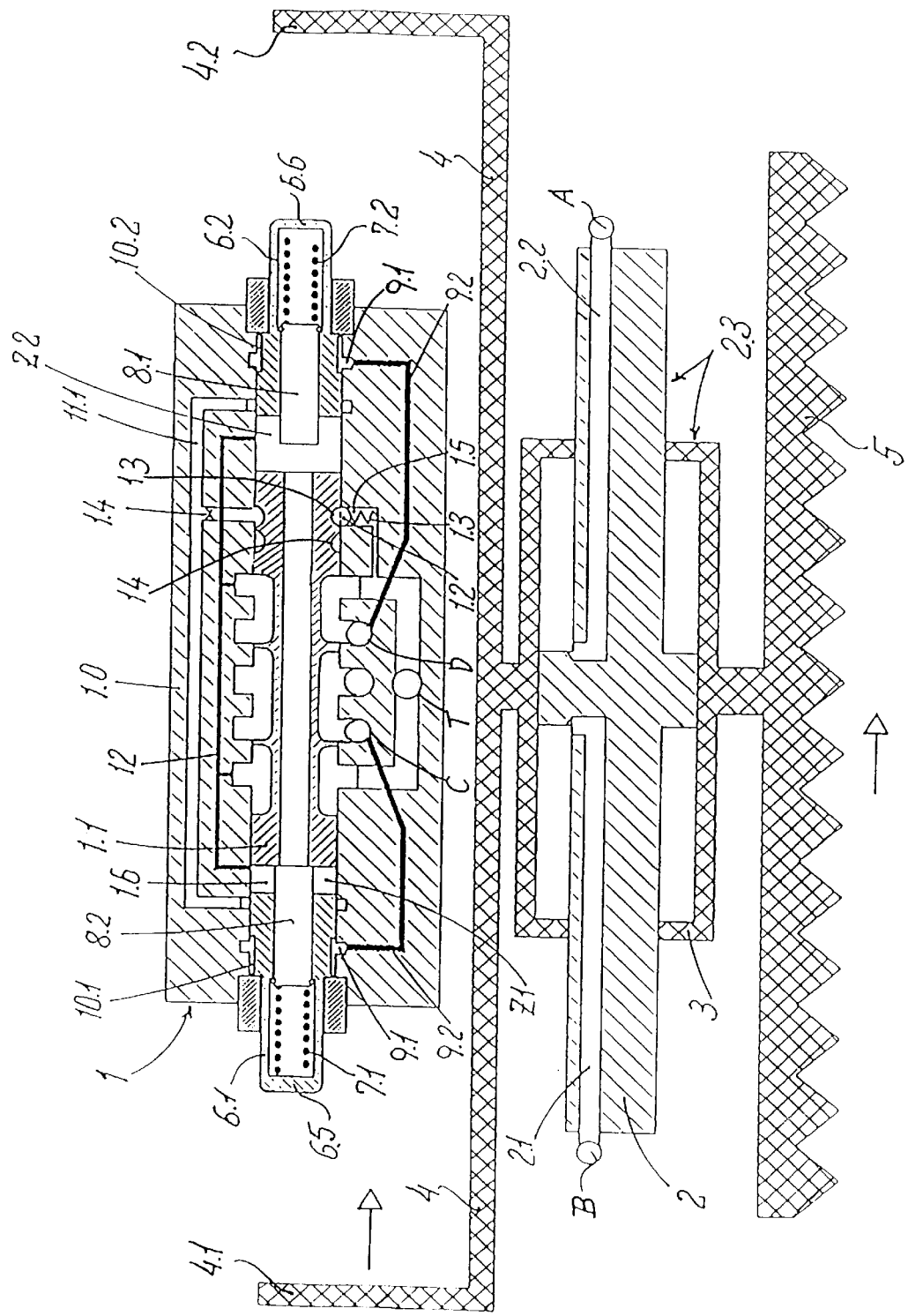
FIG. 1 is a cross-sectional view illustrating a cutter bar in connection with a mechanically actuated directional control valve wherein the mechanically actuated directional control valve is a first end position.
Figure 2:
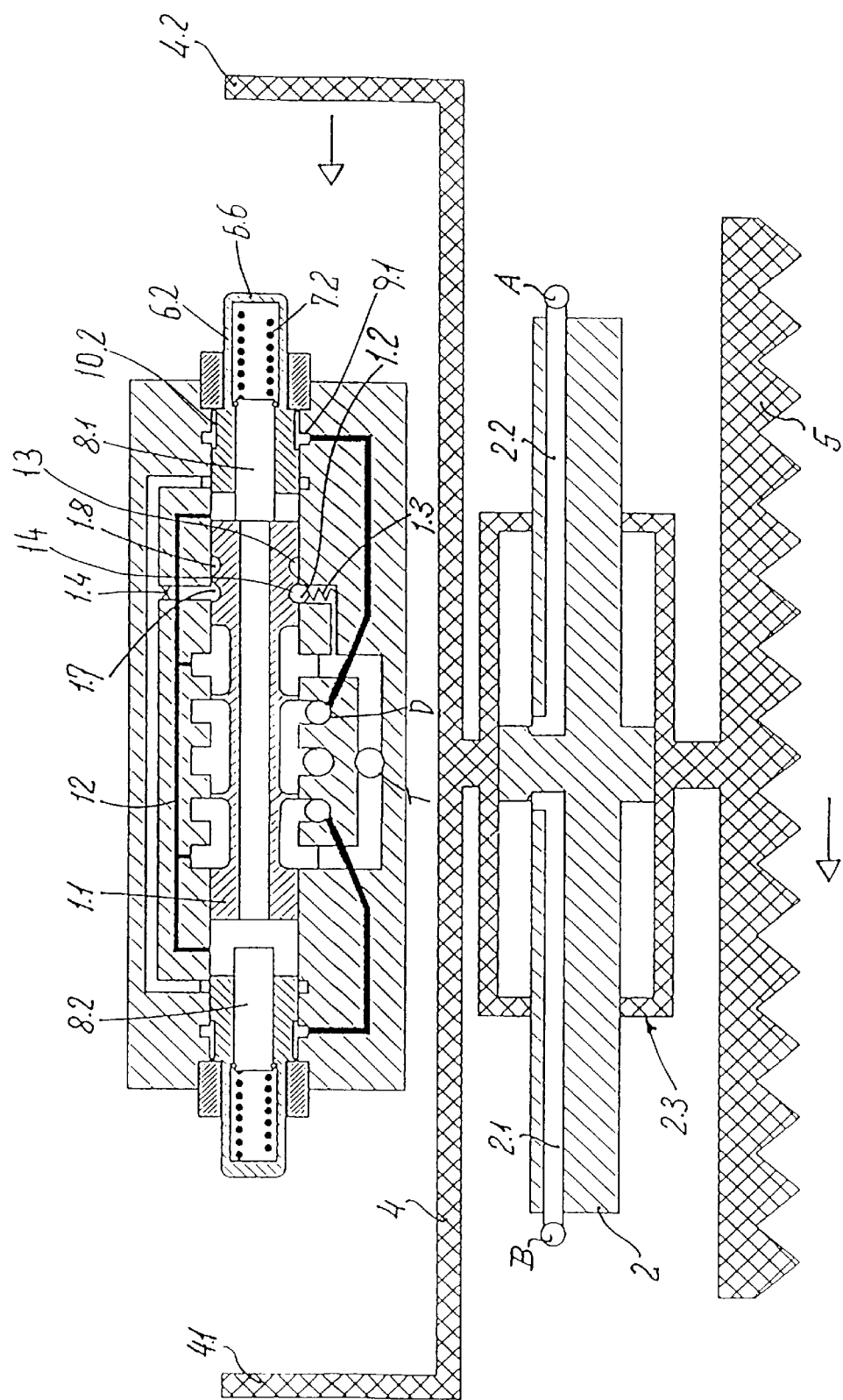
FIG. 2 is a cross-sectional view of the cutter bar in connection with the mechanically actuated directional control valve illustrated in FIG. 1 but in a second end position.

FIGS. 1 and 2 illustrate a cross-sectional view of a cutter bar 5 in connection with a mechanically actuated directional control valve 1 of a harvester. The mechanically actuate directional control valve 1 has a valve housing 1.0 and a valve piston 1.1 axially displaceable and operatively, moveably mounted in a central boring 1.6 in the valve housing 1.0 for switching or activating a hydraulic piston-cylinder unit 2.3 for the purposes of driving the cutter bar 5. The hydraulic piston-cylinder unit 2.3 is operatively connected to the mechanically actuated directional control valve 1 for driving the cutter bar 5 and operatively connected to the harvester. The cutter bar 5 is oscillated by the hydraulic piston-cylinder unit 2.3.

The mechanically actuated directional control valve 1 has a first end position and a second end position. FIG. 1 illustrates the mechanically actuated directional control valve 1 in the first end position, and FIG. 2 illustrates the mechanically actuated directional control valve 1 in the second end position. A latch 1.2 of the hydraulic piston-cylinder unit 2.3 latches or locks into either a first recess 13 for the first position or a second recess 14 for the second position. The valve housing 1.0 of the mechanically actuated directional control valve 1 and connecting devices 2 of the hydraulic piston-cylinder unit 2.3 are operatively attached to a frame (not shown) of the cutter bar 5. A cylinder 3 is operatively connected to actuating bracket 4 and to the cutter bar 5. A plurality of the hydraulic piston-cylinder units 2.3 are operatively arranged on the cutter bar 5 and are supplied by the same mechanically actuated directional control valve 1. The plurality of the hydraulic piston-cylinder units 2.3 are operatively connected in parallel by hydraulic supply lines B or A. A pressure or force is distributed uniformly to a plurality of locations throughout the hydraulic supply lines B or A.

FIG. 1 illustrates the first end position of the mechanically actuated directional control valve 1. In the first end position, the hydraulic supply lines B of the mechanically actuated directional control valve 1 is operatively connected to a first boring 2.1. The first boring 2.1 is operatively connected to a tank T. Hydraulic fluid is supplied from the hydraulic supply lines B to the first boring 2.1 and then to the tank T. The addition of hydraulic fluid builds pressure within the hydraulic piston-cylinder unit 2.3 thereby moving the cutter bar 5 to the right until a first bracket 4.1 reaches a first cover 6.5 of a first sleeve 6.1. As the first bracket 4.1 is moved to the right, the first bracket 4.1 will move the first sleeve 6.1 into the valve housing 1.0. A first spring 7.1 is placed under tension or compressed, and a first plunger 8.2 rests on the valve piston 1.1. The latch 1.2 prevents the valve piston 1.1 from moving freely when latched. The latch 1.2 is ball shaped, however, various latching devices are capable of substitution. As the first bracket 4.1 and the first sleeve 6.1 continue to move to the right, at least one first annular groove 10.1, which is connected to at least one second annular groove 9.1, is displaced until it reaches a control channel 11.1. Because the at least one annular groove 9.1 is connected to a first pressure line C via a control line 9.2, the latch 1.2, which is loaded by a spring 1.3, is now pressed hydraulically out of the first recess 13 by virtue of a restrictor 1.4. The first plunger 8.2 displaces the valve piston 1.1 by means of the energy stored in the first spring 7.1 into the second end position as illustrated in FIG. 2, wherein the movement of the valve piston 1.1 is stopped resiliently by a second plunger 8.1. During the switch-over process from the first end position illustrated in FIG. 1 to the second end position illustrated in FIG. 2, all of the connecting elements are connected together negatively in the transition phase so that pressure peaks cannot occur as would be the case for a positive coverage. Due to the removal of the pressure and following a delay created by the restrictor 1.4, the latch 1.2 moves into the new latching position when the valve piston 1.1 stops against the second plunger 8.1 as illustrated in FIG. 2.

The switching process or the movement of the valve piston 1.1 that was described above is now described in the opposite directional in analogous manner hereinafter. Referring now to FIG. 2 which illustrates the second end position of the mechanically actuated directional control valve 1. In the second end position, the hydraulic supply lines A of the mechanically actuated directional control valve 1 is operatively connected to a second boring 2.2. The second boring 2.2 is operatively connected to the tank T. The hydraulic fluid is supplied from the hydraulic supply lines A to the second boring 2.2 and then to the tank T. The addition of hydraulic fluid builds pressure within the hydraulic piston-cylinder unit 2.3 thereby moving the cutter bar 5 to the left until a second bracket 4.2 reaches a second cover 6.6 of a second sleeve 6.2. As the second bracket 4.2 is moved to the left, the second bracket 4.2 will move the second sleeve 6.2 into the valve housing 1.0. A second spring 7.2 is placed under tension or compressed, and the second plunger 8.1 rests on the valve piston 1.1. The latch 1.2 prevents the valve piston 1.1 from moving freely when latched. As the second bracket 4.2 and the second sleeve 6.2 continue to move to the left, the at least one first annular groove 10.1, which is connected to the at least one second annular groove 9.1, is displaced until it reaches the control channel 11.1. Because the at least one annular groove 9.1 is connected to a second pressure line D via the control line 9.2, the latch 1.2, which is loaded by the spring 1.3, is now pressed hydraulically out of the second recess 14 by virtue of the restrictor 1.4. The second plunger 8.1 displaces the valve piston 1.1 by means of the energy stored in the second spring 7.2 into the first end position as illustrated in FIG. 1, wherein the movement of the valve piston 1.1 is stopped resiliently by the first plunger 8.2. During the switch-over process from the second end position illustrated in FIG. 2 to the first end position illustrated in FIG. 1, all of the connecting elements are connected together negatively in the transition phase so that pressure peaks cannot occur as would be the case for a positive coverage. Due to the removal of the pressure and following a delay created by the restrictor 1.4, the latch 1.2 moves into the new latching position when the valve piston 1.1 stops against the first plunger 8.2 as illustrated in FIG. 1.

Referring to both FIGS. 1 and 2, the first plunger 8.2 and the second plunger 8.1 are alternately, mechanically, and axially displaceable in the valve housing 1.0 by the mechanically actuated hydraulic piston-cylinder unit 2.3 operatively connected thereto, thereby alternately moving the valve piston 1.1 axially from the first end position to the second end position and then from the second end position to the first end position. The first plunger 8.2 and the second plunger 8.1 are surrounded by the first sleeve 6.1 and the second sleeve 6.2, respectively, such that there is play there between. One end of the first spring 7.1 and the second spring 7.2 is supported on the first plunger 8.2 and the second plunger 8.1, respectively, at the end thereof remote from the valve piston 1.1 while the opposite end of the first spring 7.1 and the second spring 7.2 are supported on the outermost end of the first sleeve 6.1 and the second sleeve 6.2, respectively. The first sleeve 6.1 and the second sleeve 6.2 are acted upon alternately, via the first spring 7.1 and the second spring 7,2, respectively on the first plunger 8.2 and the second plunger 8.1, respectively. The first plunger 8.2 and the second plunger 8.1 alternately displace the valve piston 1.1. The valve piston 1.1 is adapted to be latched or locked in the first end position or the second end position by the latch 1.2 and the first recess 13 and the second recess 14.

The strength of the restrictor 1.4, the boring 1.5 and the spring 1.3 should be sufficiently strong to support the aforementioned design. In an alternative embodiment, a plurality of spring-loaded balls may be arranged around the periphery taking into account the latching forces. Because of the change of volume in the valve housing 1.0 during the displacement of the first sleeve 6.1 or the second sleeve 6.2 to the right or left, respectively, both sides of the valve piston 1.1 are operatively connected to the tank T via an equalizing line 12. The valve piston 1.1 is hollow bored.

Due to the valve piston 1.1 being arrested or latched in either the first end position or the second end position by the latch 1.2 during the biasing phase by either the first spring 7.1 or the second spring 7.2, a first end position or second end position will be retained even if a drop in pressure should suddenly occur. When the latch 1.2 is pressed out hydraulically from the first end position or second end position via the restrictor 1.4, the valve piston 1.1 is moved axially solely by means of the force of the first spring 7.1 or the second spring 7.2 as the case may be. A sudden drop in pressure would have no negative consequences since the energy stored in either the first spring 7.1 or the second spring is sufficient to displace the valve piston 1.1 into the first end position or the second end position as the case may be and thereby latching the valve piston 1.1 via the latch 1.2.

What is claimed is:

1. An agricultural harvesting machine having a hydraulic piston-cylinder unit, comprising:

a directional control valve operatively connected to the hydraulic piston-cylinder unit;

a cutter bar operatively connected to the hydraulic piston-cylinder unit;

a valve housing located in the directional control valve;

a valve piston axially displaceable and operatively, moveably mounted in a central boring in the directional control valve for switching the hydraulic piston-cylinder unit thereby driving a cutter bar in an oscillatory manner; and a first plunger and a second plunger operatively, alternatively, and axially displaced from the valve piston in the directional control valve, wherein the directional control valve is operatively connected to the hydraulic piston-cylinder unit.

2. An agricultural harvesting machine having a hydraulic piston-cylinder unit, comprising:

a directional control valve operatively connected to the hydraulic piston-cylinder unit;

a cutter bar operatively connected to the hydraulic piston-cylinder unit;

a valve housing located in the directional control valve;

a valve piston axially displaceable and operatively, moveably mounted in a central boring in the directional control valve for switching the hydraulic piston-cylinder unit thereby driving a cutter bar in an oscillatory manner;

a first plunger and a second plunger operatively, alternatively, and axially displaced from the valve piston in the directional control valve, wherein the directional control valve is operatively connected to the hydraulic piston-cylinder unit;

said directional control valve further including:

a first sleeve operatively connected to the first plunger, and a second sleeve operatively connected to the second plunger, and wherein a space is provided between the operative connections;

a first spring is operatively connected to the first plunger, wherein a connection is at an end of the first plunger remote from the valve piston, and a second spring is operatively connected to the second plunger, wherein a connection is at an end of the second plunger remote from the valve piston;

a first end of the first spring is operatively connected to and supported by the first sleeve and first end of the second spring is operatively connected to and supported by the second sleeve;

wherein the first sleeve and the second sleeve alternately compress the first spring and the second spring, respectively; and wherein the first spring and the second spring alternatively displace the first plunger and the second plunger, respectively, thereby axially displacing the valve piston from a first end position to a second end position and from the second end position to the first end position.

3. The agricultural harvesting machine having the hydraulic piston-cylinder unit according to claim 2, said directional control valve further including:

a latch for alternating latching the valve piston in the first end position and the second end position.

4. The agricultural harvesting machine having the hydraulic piston-cylinder unit according to claim 3, said directional control valve further including:

a first groove and a second groove in the valve housing for receiving the latch; and a spring boring in the valve housing for housing a spring, wherein the spring is positioned to mechanically influence the latch into the first groove or the second groove, depending on the location of the valve piston, thereby latching the valve piston in the first end position or the second end position.

5. The agricultural harvesting machine having the hydraulic piston-cylinder unit according to claim 2, said directional control valve further including:

a first groove and a second groove in the valve housing for receiving the latch; and a boring in the valve housing for housing a spring, wherein the spring is positioned to position the latch into the first groove or the second groove; depending on the location of the valve piston, thereby latching the valve piston in the first end position or the second end position.

6. The agricultural harvesting machine having the hydraulic piston-cylinder unit according to claim 5, wherein the first groove and the second groove are located in the valve piston.

7. The agricultural harvesting machine having the hydraulic piston-cylinder unit according to claim 5, said directional control valve further including:

a channel operatively connected to the first groove and the second groove, and wherein pressurized hydraulic fluid is applied to the first groove or the second groove having the latch engaged thereto.

8. The agricultural harvesting machine having the hydraulic piston-cylinder unit according to claim 7, said directional control valve further including:

two cylinder chambers located in the valve housing, and wherein the two cylinders are bounded by the valve piston at one end and the first plunger and the second plunger at the opposite end and connected together via the channel.

9. The agricultural harvesting machine having the hydraulic piston-cylinder unit according to claim 7, said directional control valve further including:

a restrictor operatively connected to the channel for disengaging the latch.

10. The agricultural harvesting machine having the hydraulic piston-cylinder unit according to claim 9, said directional control valve further including:

a first boring and second boring operatively connected to a first pressure line and a second pressure line, respectively; and wherein the first pressure line or the second pressure line supplies hydraulic fluid to disengage the restrictor.

11. The agricultural harvesting machine having the hydraulic piston-cylinder unit according to claim 10, said directional control valve further including:

hydraulic supply lines for supplying hydraulic fluid to the first boring and the second boring, and wherein the hydraulic supply lines alternatively pressurize the first boring or the second boring; and a tank operatively connected to ends of the first boring and the second boring remote from the hydraulic supply lines, thereby serving as a return line dependent on the valve piston positioning.

12. The agricultural harvesting machine having the hydraulic piston-cylinder unit according to claim 2, said directional control valve further including:

a first cover that is operatively connected to, encloses and supports a second end of the first spring, and a second cover that is operatively connected to, encloses and supports a second end of the second spring.

13. The agricultural harvesting machine having the hydraulic piston-cylinder unit according to claim 12, said directional control valve further including:

a channel operatively connected to the first groove and the second groove, and wherein pressurized hydraulic fluid is applied to the first groove or the second groove having the latch engaged thereto.

14. The agricultural harvesting machine having the hydraulic piston-cylinder unit according to claim 2, wherein:
the first groove or the second groove receiving the hydraulic fluid enables the first sleeve or the second sleeve, respectively to displace and compress the first spring or the second spring, respectively, thereby axially displacing the first plunger or the second plunger, respectively, and wherein the first plunger or second plunger displaces the valve piston after the latch is released.

15. The agricultural harvesting machine having a hydraulic piston-cylinder unit according to claim 2, further including:
a cylinder operatively connected to the hydraulic piston-cylinder unit; and
a bracket having a first bracket end and a second bracket end, wherein the cylinder is operatively connected to the cutter bar and the bracket and when the bracket is moved, the first bracket or the second bracket engages the first sleeve or the second sleeve, respectively.

* * * * *